(12) United States Patent
Wagner

(10) Patent No.: US 10,914,687 B2
(45) Date of Patent: Feb. 9, 2021

(54) APPARATUS AND METHOD FOR THE OPTICAL DETECTION OF INNER WALLS

(71) Applicant: SAC SIRIUS ADVANCED CYBERNETICS GMBH, Karlsruhe (DE)

(72) Inventor: Christoph Wagner, Königsbach-Stein (DE)

(73) Assignee: SAC SIRIUS ADVANCED CYBERNETICS GMBH, Karlsruhe (DE)

( * ) Notice: Subject to any disclaimer, the term of this patent is extended or adjusted under 35 U.S.C. 154(b) by 251 days.

(21) Appl. No.: 15/576,234

(22) PCT Filed: May 19, 2016

(86) PCT No.: PCT/EP2016/061341
§ 371 (c)(1),
(2) Date: Nov. 21, 2017

(87) PCT Pub. No.: WO2016/188871
PCT Pub. Date: Dec. 1, 2016

(65) Prior Publication Data
US 2018/0156738 A1    Jun. 7, 2018

(30) Foreign Application Priority Data
May 22, 2015    (DE) .......... 10 2015 209 455

(51) Int. Cl.
*G01N 21/954*    (2006.01)
*G01B 11/12*    (2006.01)
(Continued)

(52) U.S. Cl.
CPC .......... *G01N 21/954* (2013.01); *G01B 11/12* (2013.01); *G01B 11/24* (2013.01);
(Continued)

(58) Field of Classification Search
CPC ... G01N 2021/9542; G01N 2021/9544; G01N 2021/9545; G01N 2021/9548;
(Continued)

(56) References Cited

U.S. PATENT DOCUMENTS 4,967,092 A * 10/1990 Fraignier ............... G01B 11/24
250/559.07
5,004,339 A *  4/1991 Pryor ..................... G01B 11/00
250/559.39
(Continued)

FOREIGN PATENT DOCUMENTS

CN    101109715 A    1/2008
CN    101206183 A    6/2008
(Continued)

OTHER PUBLICATIONS

English Translation of the International Preliminary Report on Patentability (Ch. I), dated Nov. 28, 2017, IB, Geneva, incorporating the English Translation of the Written Opinion of the ISA for PCT/EP2016/061341, ISA/EP, Rijswijk, NL, dated Aug. 22, 2016.
(Continued)

*Primary Examiner* — Gordon J Stock, Jr.
(74) *Attorney, Agent, or Firm* — Stephen T. Olson; Harness, Dickey & Pierce, P.L.C.

(57) ABSTRACT

An apparatus for the optical detection of inner walls includes at least one camera, an optical imaging arrangement, and an illumination arrangement. The apparatus is configured to record in a panoramic view by means of the camera a plurality of regions of an inner wall which are axially offset from one another. The apparatus is distinguished by virtue of the illumination arrangement having at least two different functional states, wherein a first brightness distribution emitted by the illumination arrangement is assigned to a first functional state, the brightness distribution differing from a (Continued)

second brightness distribution in at least one second functional state.

21 Claims, 7 Drawing Sheets

(51) Int. Cl.
  *G01B 11/25* (2006.01)
  *G01B 11/30* (2006.01)
  *G01B 11/24* (2006.01)
(52) U.S. Cl.
  CPC ........ *G01B 11/2518* (2013.01); *G01B 11/306* (2013.01); *G01N 2021/9544* (2013.01); *G01N 2021/9548* (2013.01); *G01N 2201/061* (2013.01); *G01N 2201/0635* (2013.01)
(58) Field of Classification Search
  CPC ..... G01N 2201/061; G01N 2201/0635; G01N 21/954; G01N 2021/9546; G01N 21/88; G01N 21/8803; G01N 21/8806; G01N 21/9515; G01N 2021/8809; G01N 2021/8816; G01N 2021/8825; G01N 2021/8835; G01N 2021/8838; G01N 2021/8841; G01N 2021/8845; G01B 11/12; G01B 11/2518; G01B 11/2527; G01B 11/306; G01B 11/24; G01B 11/25; G01B 11/30; G01B 11/303
  See application file for complete search history.

(56) References Cited

U.S. PATENT DOCUMENTS

| | | | | |
|---|---|---|---|---|
| 5,402,165 A * | 3/1995 | Linville | ............... | E21B 17/028 348/85 |
| 5,895,927 A * | 4/1999 | Brown | ............... | G01B 11/12 250/559.19 |
| 5,933,231 A * | 8/1999 | Bieman | ............... | G01B 11/12 356/241.1 |
| 6,115,193 A * | 9/2000 | Shu | ............... | G01J 1/04 348/E5.03 |
| 6,327,374 B1 | 12/2001 | Piironen et al. | | |
| 6,522,777 B1 * | 2/2003 | Paulsen | ............... | G01B 11/2513 356/237.2 |
| 6,697,102 B1 | 2/2004 | Olsson et al. | | |
| 7,092,004 B2 * | 8/2006 | Kuikka | ............... | B08B 9/0433 348/82 |
| 7,273,298 B2 * | 9/2007 | Laschke | ............... | G02B 21/06 340/584 |
| 7,286,286 B2 * | 10/2007 | Obuchi | ............... | G02B 21/082 359/385 |
| 7,636,204 B1 * | 12/2009 | Bourget | ............... | E21B 47/0002 356/241.5 |
| 8,049,901 B2 * | 11/2011 | Aoki | ............... | G01B 11/12 356/601 |
| 8,841,603 B1 * | 9/2014 | Blanton | ............... | G01B 11/2518 250/256 |
| 8,842,273 B2 * | 9/2014 | Bergman | ............... | G01B 11/12 356/241.1 |
| 9,835,564 B2 * | 12/2017 | Olsson | ............... | G01N 21/8803 |
| 10,009,526 B2 * | 6/2018 | Kisner | ............... | G02B 23/2461 |
| 10,440,332 B2 * | 10/2019 | Olsson | ............... | G03B 37/04 |
| 2004/0138590 A1 * | 7/2004 | Jensen | ............... | A61B 1/227 600/587 |
| 2004/0233421 A1 | 11/2004 | Weinhold | | |
| 2007/0153296 A1 * | 7/2007 | Schick | ............... | A61B 5/0068 356/609 |
| 2009/0225321 A1 * | 9/2009 | Bendall | ............... | G01B 11/2527 356/447 |
| 2010/0060904 A1 * | 3/2010 | Keightley | ............... | G01B 11/2513 356/608 |
| 2011/0001984 A1 * | 1/2011 | Keller | ............... | G02B 13/06 356/612 |
| 2012/0069172 A1 * | 3/2012 | Hudritsch | ............... | H04N 5/23238 348/84 |
| 2012/0087143 A1 * | 4/2012 | Hill | ............... | G01N 21/8806 362/551 |
| 2012/0190923 A1 | 7/2012 | Kunz et al. | | |
| 2013/0027515 A1 * | 1/2013 | Vinther | ............... | A61B 1/00177 348/44 |
| 2013/0345510 A1 * | 12/2013 | Hadani | ............... | A61B 1/00172 600/113 |
| 2014/0226156 A1 * | 8/2014 | Bergman | ............... | G01N 21/954 356/241.1 |
| 2014/0253913 A1 * | 9/2014 | Bergman | ............... | G01N 21/954 356/241.1 |
| 2014/0313506 A1 * | 10/2014 | Bergman | ............... | G01N 21/954 356/241.6 |
| 2016/0025653 A1 * | 1/2016 | Jalilian | ............... | A61B 1/00039 356/241.1 |
| 2016/0261829 A1 * | 9/2016 | Olsson | ............... | G03B 17/561 |

FOREIGN PATENT DOCUMENTS

| | | | |
|---|---|---|---|
| CN | 101881738 A | 11/2010 | |
| CN | 102608124 A | 7/2012 | |
| DE | 19815201 A1 | 10/1999 | |
| DE | 102007031358 A1 | 3/2009 | |
| DE | 102009019459 A1 | 12/2010 | |
| DE | 102009043538 A1 | 3/2011 | |
| DE | 102009043523 A1 | 4/2011 | |
| DE | 102010025752 A1 | 1/2012 | |
| DE | 102013108457 A1 | 4/2014 | |
| EP | 1030173 A1 | 8/2000 | |
| JP | 2010-223621 A | 10/2010 | |
| WO | WO-02/090952 A1 | 11/2002 | |
| WO | WO-2009003692 A1 * | 1/2009 | ........... G03B 37/005 |

OTHER PUBLICATIONS

International Search Report and Written Opinion of the ISA for PCT/EP2016/061341, ISA/EP, Rijswijk, NL, dated Aug. 22, 2016.
Office Action for corresponding Chinese Application CN107660266.

* cited by examiner

APPARATUS AND METHOD FOR THE OPTICAL DETECTION OF INNER WALLS

CROSS REFERENCE TO RELATED APPLICATIONS

This application is a U.S. National Phase Application under 35 U.S.C. 371 of International Application No. PCT/EP2016/061341 filed on May 19, 2016 and published in German as WO 2016/188871 A1 on Dec. 1, 2016. This application is based on and claims the benefit of priority from German Patent Application No. 10 2015 209 455.3 filed May 22, 2015. The entire disclosures of all of the above applications are incorporated herein by reference.

The invention relates to an apparatus and a method for optical detection of interior walls, in particular for optical inspection of interiors and/or for determining the shape of cavities, in particular of bores. In particular, this should permit examination of the walls of cylindrical bores and in particular the walls of cylindrical bores in internal combustion engines and/or detection of their shape. In particular, this should permit 100% monitoring of bores in such a way as to keep pace with the production cycle.

Existing methods are capable of full-surface detection of the walls of bores, but these methods are based on a camera image that cannot differentiate unambiguously between elevations and recesses in the cylinder wall in comparison with the ideal geometry, based on possible discolorations and differences in brightness of the material. Other existing methods permit an accurate geometric measurement of small sections of the cylinder geometry but are not suitable for 100% full-surface examination within a production cycle.

The object of the invention is therefore to create an apparatus and a method, which will not have the aforementioned disadvantages and will make it possible in particular to detect elevations and recesses in the bore walls.

This object is achieved by creating the subject matters of the independent claims. Advantageous embodiments are derived from the dependent claims.

This object is achieved in particular by creating an apparatus for optical detection of interior walls, such that the apparatus has at least one camera, one optical imaging arrangement and one lighting arrangement, wherein the apparatus is equipped to use the camera to record a plurality of regions of an interior wall that are offset axially relative to one another in a panoramic view. The apparatus is characterized in that the lighting arrangement has at least two different functional states, wherein a first brightness distribution that is emitted by the lighting arrangement is assigned to a first functional state, this brightness distribution being different from a second brightness distribution, which is assigned to a second functional state of the lighting arrangement. The lighting arrangement is thus equipped to generate a first brightness distribution in the first functional state in particular, wherein it is equipped to generate a second brightness distribution different from the first brightness distribution in the second functional state. By means of the images recorded with different brightness distributions, it is possible to detect elevations and recesses in the interior walls examined and in particular to differentiate them clearly from discolorations and differences in the brightness of the material of the interior wall. A full-area 100% examination is impossible, in particular within one production cycle, in particular since the interior wall can be illuminated from various angles by the lighting arrangement and because, on the other hand, it can be observed in a panoramic view and preferably over its total depth.

The fact that the apparatus is equipped to record regions of the interior wall that are offset axially from one another means in particular that it is equipped to record a plurality of regions that are offset relative to one another along an optical axis of the apparatus, in particular of the camera and/or of the imaging arrangement. An axial direction is thus defined in particular by an optical axis of the apparatus. Alternatively or additionally, the axial direction is preferably defined by a longitudinal axis of a bore in question, the interior wall of which is recorded by the camera. The optical axis of the apparatus and the longitudinal axis of the bore especially preferably coincide.

The fact that the apparatus is equipped to record regions of the interior wall in a panoramic view can be interpreted to mean in particular that the apparatus is able to record a view of the interior wall consisting of 360°—as seen in the circumferential direction—in each individual image recorded. Thus, in particular, an axial section of the interior wall along a closed circumferential line is recorded. The circumferential direction extends concentrically around the axial direction. Moreover, a radial direction is understood below to be a direction perpendicular to the axial direction.

The apparatus is preferably at least partially displaceable relative to the interior wall—preferably completely displaceable. It is possible that at least parts of the apparatus are displaced relative to the interior wall, which is held in a stationary position. It is also possible that the interior wall is displaceable relative to the apparatus, which is in a stationary arrangement or is displaceable at least relative to the parts of the apparatus that are in a stationary arrangement. However, it is also possible for at least parts of the apparatus, optionally the entire apparatus as well as the interior wall to be displaceable. In particular, the apparatus is preferably equipped to be displaceable at least partially—preferably completely—inside a bore. Then the interior wall of the bore can be detected by means of the apparatus.

The apparatus is especially preferably equipped to be displaced in the axial direction. The apparatus may be displaced incrementally or continuously in the axial direction. It is possible for only individual components of the apparatus to be displaced in the axial direction, in particular the optical imaging arrangement and/or the lighting arrangement wherein other parts of the apparatus, for example, the at least one camera, the lighting arrangement and/or the optical imaging arrangement, may also be stationary.

The term "brightness distribution" is understood in particular to refer to a luminous density—preferably for visible light—or a radiation density—preferably for invisible radiation, in particular infrared or ultraviolet radiation.

The lighting arrangement preferably has a plurality of functional states, in particular more than two functional states, wherein the brightness distribution assigned to each functional state is different from the brightness distributions of the other functional states. The lighting arrangement preferably has four functional states with four different brightness distributions.

In particular, an embodiment of the apparatus, which is characterized in that the preferred lighting arrangement has at least three different functional states, preferably at least four, wherein a brightness distribution that is different from the brightness distributions of the other functional states is assigned to each functional state.

In a preferred embodiment, the apparatus has a control unit equipped to control the lighting arrangement, in particular to select and activate a functional state of the lighting arrangement. The control unit is preferably also equipped to control the at least camera and/or to control the displacement of the apparatus relative to the interior wall in question. Activation of the various functional states, triggering of image recordings by the camera and/or displacement of the apparatus relative to the interior wall are preferably coordinated with one another in time, in particular being synchronized. It is also possible for the control unit to be equipped to control or regulate the displacement of the apparatus relative to the interior wall, wherein a distance sensor is provided to monitor the displacement and to output pulses in particular at predetermined path increments or instantaneous locations following the displacement, wherein the camera and the lighting arrangement are controlled by the pulses of the distance sensor—in particular as a function of the displacement path or the instantaneous location of the apparatus.

A preferred embodiment of the apparatus is characterized in that the camera, the optical imaging arrangement and the lighting arrangement are designed to be integrally displaceable with one another. These elements are preferably combined into one module and can be displaced jointly relative to the interior wall, in particular inside a bore. This yields an apparatus that can be handled especially easily, wherein the images recorded by the apparatus can be analyzed especially easily. At the same time, it is possible to carry out a particularly rapid examination of an interior wall by using this apparatus, so that this step can take place within a production cycle. The apparatus preferably has a cylindrical tube, on which the camera, the optical imaging arrangement and the lighting arrangement are mounted. It is possible in particular for the camera, the lighting arrangement and the imaging arrangement to be mounted in the cylindrical pipe. The cylindrical pipe is preferably transparent in at least some regions, in particular being translucent, preferably in a region through which an optical path of the lighting arrangement and/or the imaging arrangement passes.

Another preferred embodiment of the apparatus is characterized in that the at least one camera, the optical imaging arrangement and the lighting arrangement are designed to be integral with one another, in particular to be cohesive with one another. In this way, the aforementioned elements can be displaced together jointly, and the apparatus has an overall compact design.

A preferred embodiment of the apparatus is characterized in that the optical imaging arrangement has a camera lens. Additionally or alternatively, the optical imaging arrangement preferably has a mirror array. The imaging arrangement is preferably equipped to image an area of the interior wall that is observed on an image level of the camera. Additionally or alternatively, the imaging arrangement is preferably equipped to deflect light from the imaging arrangement onto the observed region of the interior wall.

Another preferred embodiment of the apparatus is characterized in that the lighting arrangement is equipped and/or arranged to directly illuminate an interior wall. In this case, the beam emitted by the lighting arrangement falls directly on the interior wall—without passing through the imaging arrangement in particular.

Alternatively or additionally, the lighting arrangement is preferably equipped and/or arranged to indirectly illuminate an interior wall, in particular through the imaging arrangement. Then the imaging arrangement serves to conduct light from the lighting arrangement to the interior wall.

Another preferred embodiment of the apparatus is characterized in that the lighting arrangement is equipped to emit brightness distributions that vary in the axial direction, in the radial direction and/or in the circumferential direction. This refers in particular to the brightness distribution at the location of formation of the brightness distribution, in particular at the location of the lighting arrangement, in particular at the location of formation of the beam. Each brightness distribution of a functional state preferably exhibits a dependence on at least one coordinate, in particular in the axial direction and or in the circumferential direction, wherein the brightness distribution along the at least one coordinate is not constant. Alternatively or additionally, the brightness distributions assigned to the various functional states differ in their dependence on the at least one coordinate. It is possible in this way to illuminate the interior wall from several directions by means of the lighting arrangement and to thereby obtain nuances of brightness, including information about the topographical properties of the interior wall.

One preferred embodiment of the apparatus is characterized in that the lighting arrangement has at least two light sources, preferably switchable independently of one another. It is possible to implement different brightness distributions by switching the light sources. Each light source preferably includes at least one lighting element, preferably a plurality of lighting elements. In particular, the light sources preferably have a group of lighting elements, which can be wired together jointly, such that the groups of lighting elements assigned to various light sources are switchable independently of one another. LEDs, for example, may be used as the lighting elements.

Alternatively or additionally, the lighting arrangement preferably has at least one planar light, which is equipped to display an initial structured lighting pattern in a first functional state, wherein the planar light is additionally equipped to display a second structured lighting pattern in a second functional state, said second structured lighting pattern being different from the first structured lighting pattern. Such a planar light may be designed, for example, in the manner of an array of individual points of light, in particular in the manner of a display. It is also possible by means of different structured lighting patterns to illuminate the interior wall from several directions. A planar light may also have at least one organic light-emitting diode (OLED) or may be designed as an OLED. When using a planar light, it is preferably possible to record reflective interior walls in bright field illumination in particular.

Another preferred embodiment of the apparatus is characterized in that the lighting arrangement has at least two planar lights, spaced an axial distance apart from one another, such that the imaging arrangement is equipped and positioned relative to the lights, so that a region of an interior wall can be imaged axially between the planar lights in the camera. It is preferable in particular to have a mirror array of the imaging arrangement arranged axially between the two planar lights. In particular, this permits an especially complex illumination of the interior wall, which is structured over a large area, and preferably allows the reflective interior wall to be recorded in bright field illumination.

Another preferred embodiment of the apparatus is characterized in that the lighting arrangement has at least two ring-shaped light sources that are spaced a distance apart from one another axially and are switchable independently of one another. In particular, the ring-shaped light sources can be activated and deactivated in alternation, and consequently, they are switchable in alternation, so that different light distributions on the interior wall are possible. The ring-shaped light sources are preferably embodied in the form of diode rings, i.e., rings of LEDs which have LEDs next to one another—as seen in the circumferential direction. An illumination direction of the ring-shaped light sources extends preferably essentially in the radial direction. In a preferred embodiment, the ring-shaped light sources extend in the form of a cylindrical jacket in the axial direction. However, it is also possible for at least one of the ring-shaped light sources to have an angle to the axial direction, such that the ring-shaped light source is arranged in particular in the form of a truncated conical jacket to the axial direction. The main illumination direction then extends obliquely to the axial direction.

It is possible for the unit to have at least one scattering element, preferably a scattering body or a scattering disk, which is arranged in front of the light sources—preferably at a suitable distance—to achieve the smoothest possible brightness distribution without any pronounced local peaks at the site of the light sources in particular.

A preferred embodiment of the apparatus has a planar light, which has at least one ring-shaped light source and one scattering body. The scattering body is preferably designed to be cylindrical and is aligned with its axis of symmetry in the axial direction of the apparatus, the at least one ring-shaped light source being arranged on an end face of the cylindrical scattering body in such a way that it passes through the scattering body in the axial direction. A first ring-shaped light source is especially preferably arranged on a first end face of the cylindrical scattering body, and the second ring-shaped light source is arranged on a second end face of the cylindrical scattering body opposite the first end face, as seen in the axial direction. Both the first ring-shaped light source and the second ring-shaped light source are arranged in such a way that each light passes through the scattering body in the axial direction, so that they have opposite directions of emission directed into the interior of the scattering body in particular.

The first ring-shaped light source and the second ring-shaped light source are preferably switchable independently of one another. In particular, the first ring-shaped light source and the second ring-shaped light source are preferably controllable independently of one another with respect to their brightness levels. Different axially structured light distributions can be created in particular by differences in the control of the first ring-shaped light source and the second ring-shaped light source—on the scattering body in particular. For example, with control of the first ring-shaped light source with a maximum brightness and, at the same time, control of the second ring-shaped light source with a minimum brightness, an axially structured light distribution can be created, in particular also a steadily increasing or decreasing light distribution, in particular a linearly or approximately linearly increasing or decreasing light distribution. On the other hand, with control of the first ring-shaped light source with a minimum brightness and control of the second ring-shaped light source with a maximum brightness, it is possible to create a different light distribution, in particular an opposite or inverted light distribution that is opposite the light distribution described previously.

The at least one ring-shaped light source preferably has a plurality of lighting elements, which may be designed as LEDs, for example. In particular, it is possible for the at least one ring-shaped light source to be designed as a diode ring. The individual lighting elements can preferably be controlled jointly or separately. Their brightness can especially be controlled—preferably independently of one another—in such a way that at least one predetermined light distribution of the planar light can preferably be created—in particular on the scattering body. A plurality of different light distributions of the planar light can preferably be created by controlling the brightness of the individual lighting elements—in particular on the scattering body. Structured light distributions can therefore also be implemented in the circumferential direction by operating the lighting elements of the at least one ring-shaped light source with different brightness levels, as seen in the circumferential direction. For example, light distributions with a sine or cosine curve or an approximation to such a curve can be created thereby.

Light distributions structured in the axial direction and/or in the circumferential direction can also be created. In particular it is advantageous if the brightness of the individual lighting elements of the first ring-shaped light source and of the second ring-shaped light source can be controlled individually.

It is preferably also possible to use a larger or smaller number of ring-shaped light sources.

Therefore, preferably at least one camera, at least one camera lens and/or mirror array and at least two switchable lights and/or at least one planar light suitable for displaying a plurality of structured lighting patterns are therefore preferably used.

The interior wall, in particular the inside surface of the bore, is illuminated from several directions. The resulting fluctuations in brightness contain information about the topographical properties of the surface of the wall. It is particularly challenging to create an optical arrangement with which it is possible, on one hand, to illuminate the wall of a bore from various directions while, on the other hand, observing the wall of the bore panoramically and over its total depth. An imaging arrangement designed as a special lens, in particular an imaging lens, comprising a conical mirror, a spherical mirror, a parabolic mirror, an elliptical mirror or some other rotationally symmetrical mirror, is preferably used for panoramically imaging an area of the interior wall, in particular a lateral surface. The mirror may also have a free-form geometry. The mirror is preferably designed with a convex shape. Alternatively, a specially designed lens, in particular a lens with a large aperture angle, for example, a fisheye lens, may also be used for this purpose. Likewise, arrangements of a plurality of planar mirrors, which detect portions of the interior wall of the bore, are also possible. This lens, in particular a rotationally symmetrical lens, is preferably aligned with its optical axis and/or axis of symmetry, so that this axis of symmetry is identical or approximately identical to the axis of the cylindrical bore. Such a lens forms cylindrical ring-shaped regions of the interior wall of the bore, preferably on planar ring-shaped regions, which can be observed with an electronic camera and preferably a lens. To observe the interior wall of the bore over a wide region of its depth or its total depth, the apparatus, including the imaging lens, is moved through the bore in the axial direction. This movement may take place continuously or incrementally.

To illuminate the interior wall, the same imaging arrangement, in particular the imaging lens or parts thereof, including in particular a conical mirror, a spherical mirror or some other rotational symmetrical mirror, is/are preferably also used. The lighting arrangement preferably consists of a plurality of light sources illuminating the inside surface of the bore either directly or preferably indirectly by means of the aforementioned lens to observe the interior wall, in particular the inside surface of the bore. The illumination in particular takes place indirectly by means of a conical mirror, a spherical mirror or some other rotationally symmetrical mirror. The number of light sources is preferably greater than one, with the number being two, three or four in particular. Alternatively, a greater number of light sources may also be used. The light sources are preferably independently switchable. These light sources, in particular the lighting elements or groups of lighting elements, are preferably arranged so that the inside surface of the bore can be illuminated by the light sources either directly or indirectly from different directions. In particular, the light sources may be arranged in the form of a ring or some other geometric shapes. An arrangement, in which the light sources are arranged in the form of a ring, whose axis of symmetry is identical or almost identical to the axis of symmetry of the rotationally symmetrical mirror, is preferred in particular. The ring may be arranged at a suitable axial distance from the mirror, in particular also in the vicinity of the camera and/or the camera lens.

This object is also achieved by creating a method for optical detection of interior walls by using an apparatus according to one of the embodiments described above. In doing so, a sequence of images of regions of the interior wall in a panoramic view, offset axially from one another, is recorded with the camera in chronological order, wherein the lighting arrangement is controlled at the same time to create variable brightness distributions during the recording of the image sequence. In so doing, the advantages already explained in conjunction with the apparatus are implemented in conjunction with the method.

In particular within the scope of the method, a plurality of images of regions that are axially offset relative to one another are recorded, wherein variable brightness distributions are created by the lighting arrangement—in particular brightness distributions that change from one image to the next. A cycle comprised of a finite number of different brightness distributions is preferably implemented, these different brightness distributions being activated periodically one after the other, wherein one image—or a plurality of images—is recorded especially preferably for each brightness distribution. After the last brightness distribution of the cycle, the first brightness distribution of the cycle is activated again, and the cycle is iterated until the method is terminated.

Within the context of the method, the apparatus, specifically the camera, the optical imaging arrangement and the lighting arrangement, is preferably displaced incrementally or continuously, at least partially in the axial direction. The apparatus is especially preferably displaced integrally, namely incrementally or continuously in the axial direction. This permits a reproducible recording of various regions of the interior wall by using a particularly simple means of analysis and rapid examination of the complete interior wall on the whole, in particular in one production cycle.

A preferred embodiment of the method is characterized in that the brightness distributions are varied at a frequency of at least 25 Hz, preferably at least 50 Hz, preferably at least 75 Hz, preferably at least 100 Hz. The brightness distributions are preferably varied by at most 50 kHz, preferably at most 10 kHz, preferably at most 2 kHz, preferably at most 500 Hz, preferably at most 200 Hz. The frequency is in particular preferably at least 25 Hz to at most 50 kHz, preferably at least 50 Hz to at most 10 kHz, preferably at least 75 Hz to at most 2 kHz, preferably at least 100 Hz to at most 500 Hz, preferably at least 100 Hz to at most 200 Hz. A change in the brightness distributions here denotes a change from one brightness distribution to the next brightness distribution, in particular within one cycle or cyclic sequence of brightness distributions.

In particular a preferred embodiment of the method is characterized in that a cyclic sequence of a predetermined number of brightness distributions is created, wherein an image is recorded for each brightness distribution and a ring-shaped region of a sensor of the camera is evaluated, wherein a radial width of the ring-shaped region—in the sensor plane—measured as the number of pixels of the sensor, is equal to the predetermined number of brightness distributions or an integral multiple thereof. An axial offset of a region of the interior wall with the next brightness distribution relative to a previous region, recorded with the immediately preceding brightness distribution in particular is selected to be equal to an axial height resulting from the number of pixels indicating the radial width of the ring-shaped region, also referred to below simply as the "pixel number," divided by the predetermined number of brightness distributions and multiplied times an optical pixel height of the sensor on the interior wall. In this procedure, a very rapid examination of the entire interior wall and a simplified evaluation are possible, in particular by an ingenious arrangement of the recorded images in a memory of an evaluation device.

The sensor is preferably read out completely after each image is recorded, or at least one rectangular region of the sensor of interest is read out, preferably having the ring-shaped region. It is also possible for a plurality of rectangular regions of interest to be read out. However, preferably only the ring-shaped region is evaluated in a computing system.

The term "optical pixel height of the sensor on the interior wall" means in particular a height resulting from the physical pixel width of a pixel on the sensor on the basis of the physical laws of imaging to be applied to the imaging arrangement, projected onto the interior wall—measured in the axial direction.

In the context of this procedure, the following becomes apparent in particular: after the recording of each image with a certain brightness distribution, the next brightness distribution is activated, and the next image is recorded with an axial offset relative to the preceding image recorded, so that after a complete cycle of brightness distributions has been finished, the axial offset between the first image of the next cycle of brightness distributions relative to the first image of the preceding cycle of brightness distributions corresponds exactly to the axial height of the pixel count multiplied times the optical pixel height on the interior wall. Due to this procedure, information is available with each brightness distribution for each region of the interior wall—except for boundary regions at the beginning and end of the method—wherein an axial displacement of the apparatus takes place after each activation of a brightness distribution at the same time and preferably after each image is recorded, so that very short measurement times can be implemented. Therefore, this apparatus need not remain in a stationary position while running through a brightness distribution cycle.

For example, if the pixel count is four per brightness distribution, and if the predetermined number of the brightness distribution is also four, then the axial offset between two images recorded in immediate chronological succession amounts to exactly one pixel height on the interior wall. However, if four brightness distributions are used, for example, and if the pixel count is eight per activated brightness distribution and per image recorded, then the axial offset between recording two successive images with different brightness distributions will amount to exactly two pixel heights on the interior wall.

An embodiment of the method in which four brightness distributions are used is preferred, wherein the pixel count is 16, and in this case the axial offset between two regions of the interior wall recorded in direct succession with different brightness distributions corresponds to exactly four times the optical pixel height of the sensor on the interior wall.

The displacement of the apparatus is preferably controlled accordingly in order to implement the procedure described previously, wherein this can take place by continuous displacement of the apparatus at a suitably adapted rate or by incremental displacement of the apparatus after each image has been recorded in particular and/or after each change in the brightness distribution. A controlled or regulated displacement is also possible, in which the camera and the lighting arrangement are controlled preferably by means of a distance sensor, in particular being triggered.

To solve the problem of lack of information for boundary regions, the examination of an interior wall to be examined is preferably begun axially before the start of the region of the interior wall to be examined and is concluded axially behind one end of the region of the interior wall to be examined, so that boundary regions that cannot be detected as part of the evaluation do not belong to the regions to be examined and therefore may be disregarded.

Another preferred embodiment of the method is characterized in that a cyclic sequence of a predetermined number of brightness distributions is created, running through at least five cycles, preferably at least 20 cycles, preferably at least 100 cycles, preferably at least 500 cycles.

An optical interior examination of a bore, in particular a cylinder bore in an internal combustion engine, a detection of the shape of a bore, in particular a cylinder bore in an internal combustion engine, an optical interior examination of a cavity and/or detection of the shape of a cavity are especially preferably carried out within the scope of the method.

Within the scope of the method, an optical interior examination of a bore in or for an engine piston is preferred, in particular including a pin bore in an engine piston or an optical interior examination of a bore in an engine piston rod, a bore in a transmission, in particular an automotive transmission, in particular an automatic transmission or the like.

This unit is preferably equipped for optical interior examination of such bores in particular.

The descriptions of the method, on the one hand, and the unit, on the other hand, are to be understood as complementary to one another. In particular, features of the apparatus that have been described explicitly or implicitly in conjunction with the method are preferably individual features or features combined with one another from a preferred embodiment of the apparatus. Similarly, method steps which have been described explicitly or implicitly in conjunction with the apparatus are preferably individual steps or steps combined with one another from a preferred embodiment of the method. The apparatus is preferably characterized by at least one feature, which is determined by at least one method step of an embodiment according to the invention or a preferred embodiment of the method. This method preferably has at least one method step, which is determined by at least one feature of an embodiment according to the invention or a preferred embodiment of the apparatus.

The invention is described in greater detail below on the basis of the drawing, in which.

Figure 1:
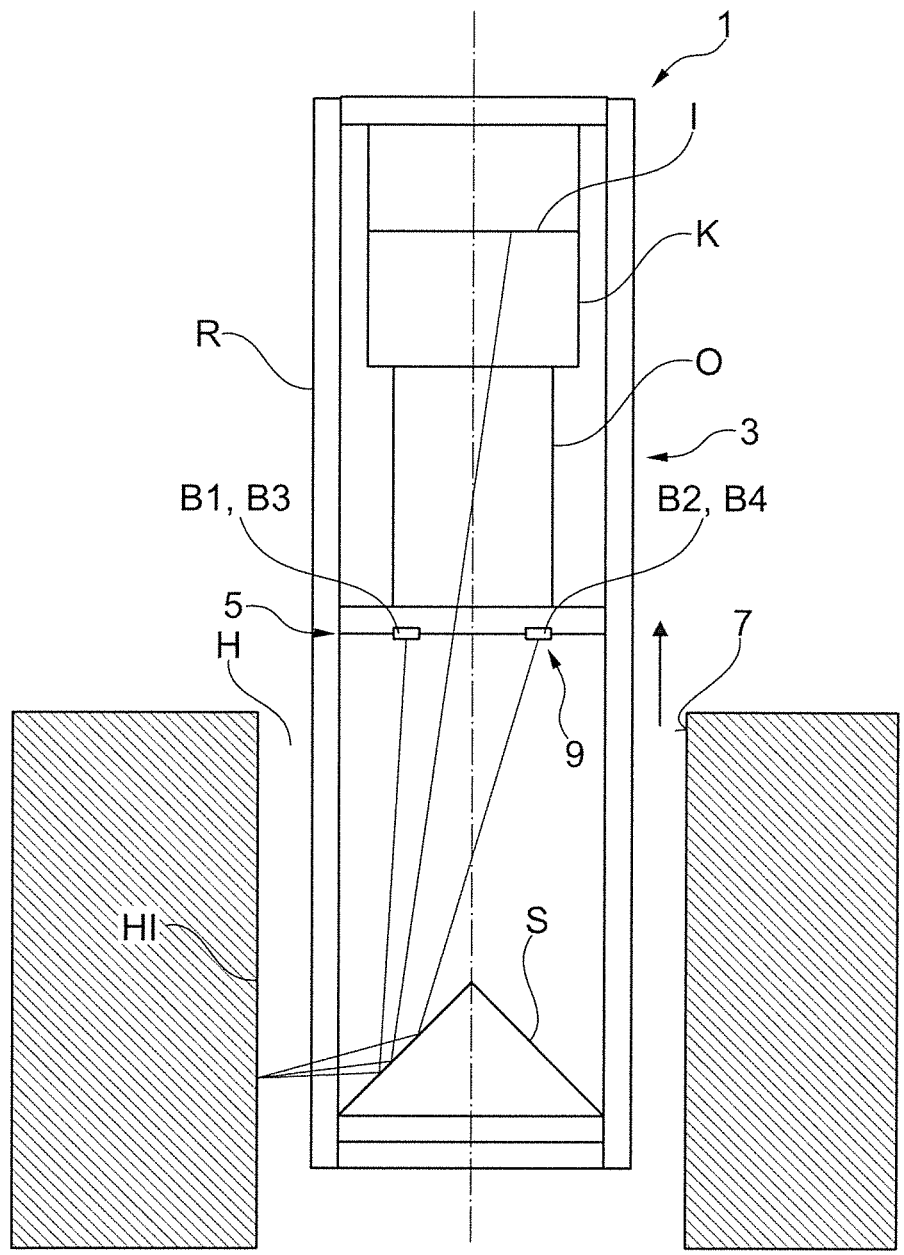
FIG. 1 shows a schematic diagram of a first embodiment of an apparatus for optical detection of interior walls.

FIG. 1 shows a side view of an apparatus 1, including a camera K, an imaging arrangement 3 with a camera lens O and a conical mirror S, and a lighting arrangement 5 with n=4 light sources 9, which are also identified as lights B1, B2, ... to Bn. In the example shown here, the conical mirror S has an aperture angle of 90°. In addition, the apparatus 1 comprises a cylindrical pipe R, which holds the aforementioned optical elements and is transparent in at least one region, preferably in the region where the optical path of the illumination and/or the observation passes through. The entire apparatus 1, which is also referred to below as an arrangement or array, is preferably first inserted into a bore or a cavity H by means of a unit (not shown here), which is first inserted into a bore or a cavity H until reaching the desired position and then is moved back in the direction of the arrow. The image may optionally be recorded during insertion into and/or extraction out of the bore. The image is especially preferably recorded during extraction from the bore. The movement may take place incrementally, but it especially preferably takes place in a continuous movement. The camera records a number of images in the course of the incremental or continuous movement. The mirror S and the camera lens O thereby record an image of a region of the interior wall 7, in particular the inside surface of the bore and/or the inside surface HI of the hollow cavity in the plane I of the camera. FIG. 1 shows one such optical path as an example. The inside surface of the bore is illuminated here by the lights B1 to Bn, the light of which is deflected by means of the mirror S and strikes the inside surface of the bore. Optical paths are also shown here as examples. The chronological sequence of lighting and image recording is described here as follows.

First, the inside surface of the bore is illuminated with a first light, for example, the light B1, and the camera records an image. The image is forwarded to a computer unit (not shown here). The image is preferably recorded during the movement. After the arrangement has traveled a defined distance, a second light is activated, for example, the light B2, and then an image is recorded. This is repeated for the other lights, namely the lights B3 and B4 in this example. Then the lighting sequence begins again with the first light, and so forth. In the course of the incremental or preferably continuous movement, a visible range of the arrangement, which is imaged in the image plane of the camera, passes over the desired region of the inside surface of the bore. The images recorded indicate points on the inside surface of the bore with different brightness distributions or lighting situations, e.g., illuminated by the lights B1, B2, B3 or B4 in the present example. Since the lights strike the inside surface of the bore from different directions, the illuminance recorded in the images in the image plane depends on the local inclination of the inside surface of the bore, among other things. This makes it possible to evaluate the images in a computer unit in such a way that topographical irregularities in the inside surface of the bore can be detected. It is also possible to evaluate brightness properties of the inside surface of the bore. The embodiment of the unit illustrated in FIG. 1 is equipped in particular for recording the inside surface of the bore in a dark field illumination.

Figure 2:
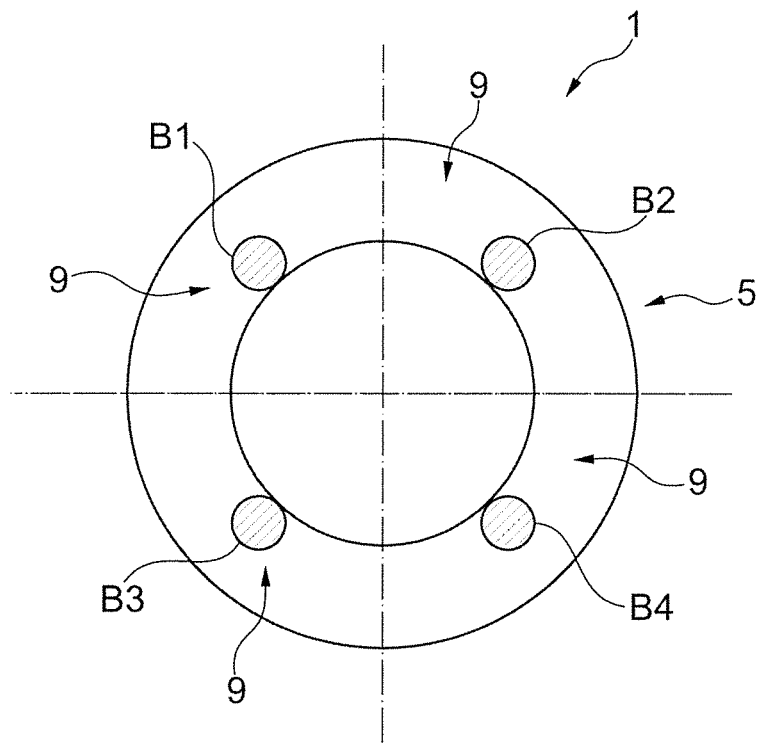
FIG. 2 shows a detailed schematic diagram of the first embodiment.

FIG. 2 shows as an example a lighting arrangement 5 consisting of four individual lights B1 to B4 arranged along a ring. The lighting arrangement 5 may optionally also contain a transparent scattering element, preferably mounted near the lights.

Figure 3:
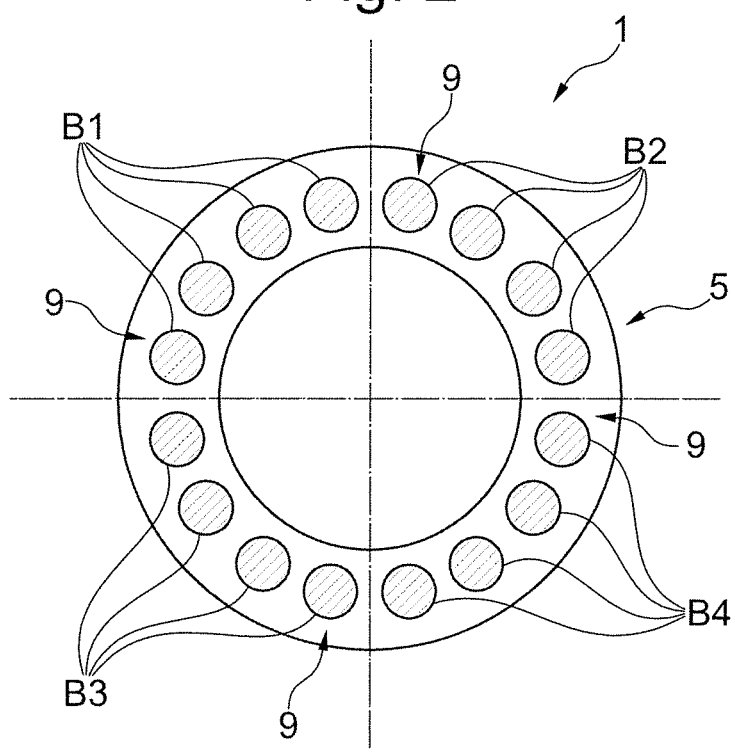
FIG. 3 shows a detailed schematic diagram of a modified embodiment of the apparatus.

Alternatively or additionally, the lights may also be formed from groups of individual lights. FIG. 3 shows four groups of individual lights, each consisting of four individual lights in turn as an example. Semiconductor radiation sources, in particular LEDs, are preferably also used as lighting elements.

Alternatively, it is possible to illuminate the inside surface of the bore directly, in particular with a plurality of lighting elements or groups of lighting elements. In a preferred embodiment, the lighting elements are arranged along a cylindrical lateral surface, the axis of which corresponds completely or approximately to the axis of the bore. The diameter of the cylindrical lateral surface is selected to be smaller than the diameter of the bore. The lateral surface is preferably subdivided into multiple segments with respect to the circumference and/or axial segments, which can be controlled independently of one another. It is possible in particular for the brightness of the illumination to be controlled in a locally structured manner along the lateral surface. With such a lighting arrangement, it is possible in particular to implement specially structured lighting patterns, in particular sine or cosine patterns or patterns approximating the shapes along the circumference of the illumination or lighting pattern approximating such a distribution. Sine or cosine patterns are possible, in particular with an offset, so there are no negative function values. Alternatively or additionally, the lighting arrangement may be controlled in such a way that the lighting can also implement structured brightness levels in the axial direction, in particular a linear brightness curve or a distribution approximating such a curve.

Figure 4:
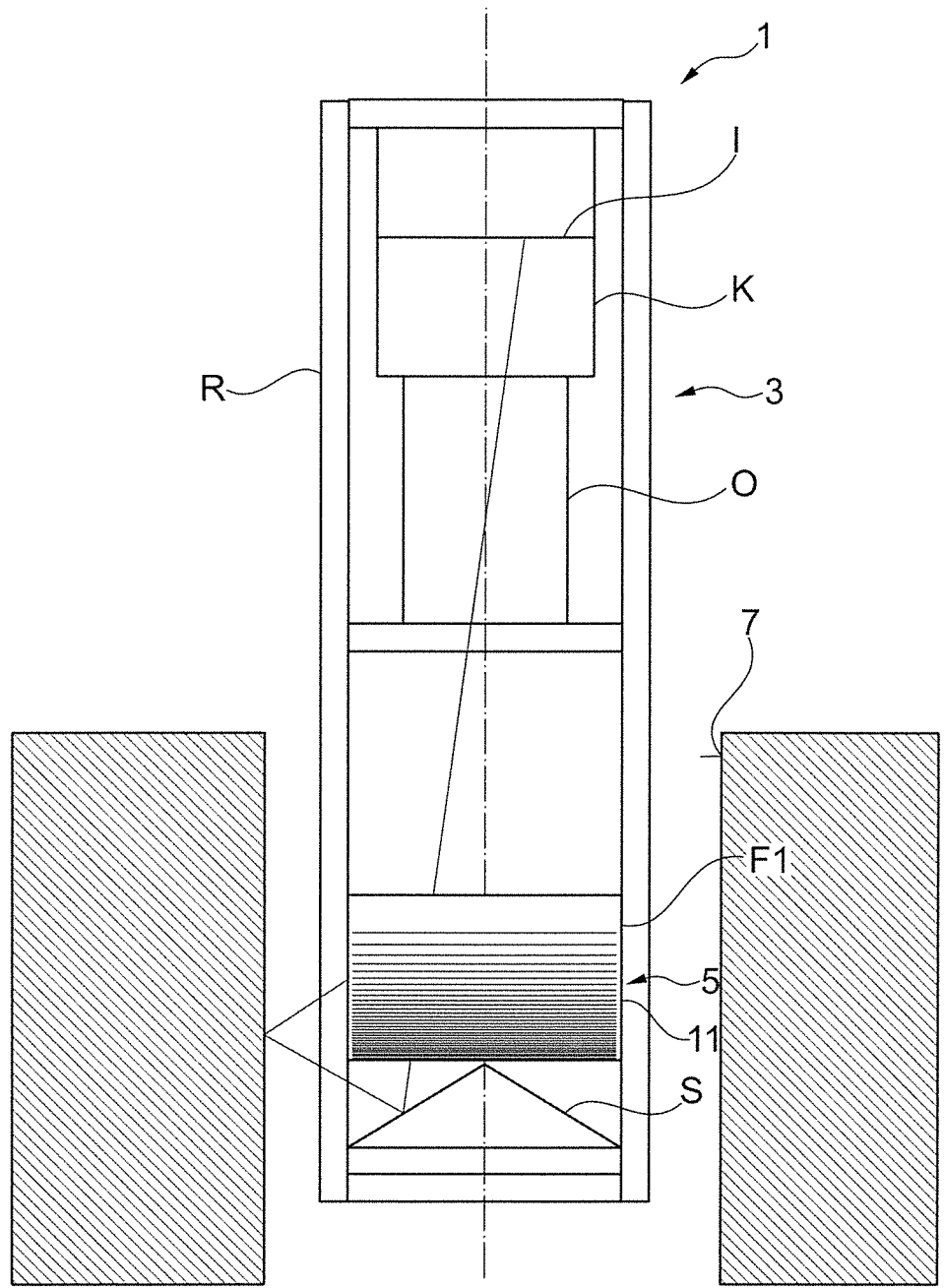
FIG. 4 shows a schematic diagram of a third embodiment of the apparatus.

FIG. 4 shows an arrangement with direct illumination of the inside surface of the bore. The arrangement may include a conical mirror S. In this example, the conical mirror has an aperture angle greater than 90°. A planar light 11, also referred to as light F1, is embodied as a cylindrical lateral surface in this example and can be controlled in such a way that multiple different light distributions can be implemented. The light F1 preferably exhibits a Lambert emission characteristic but other characteristics are also possible. The local luminous density can preferably be controlled in such a way that the different light distributions can be implemented. FIG. 4 shows as an example a light distribution, in which the luminous density increases linearly from bottom to top in the axial direction. This light distribution can be selected, for example, as the first light distribution BV1 in a series of several light distributions. For example, a distribution decreasing linearly from bottom to top axially can be chosen as the second light BV2. Such light distributions are suitable in particular for detecting inclinations of the interior wall of the bore in the axial direction. Other light distributions may follow.

Figure 5:
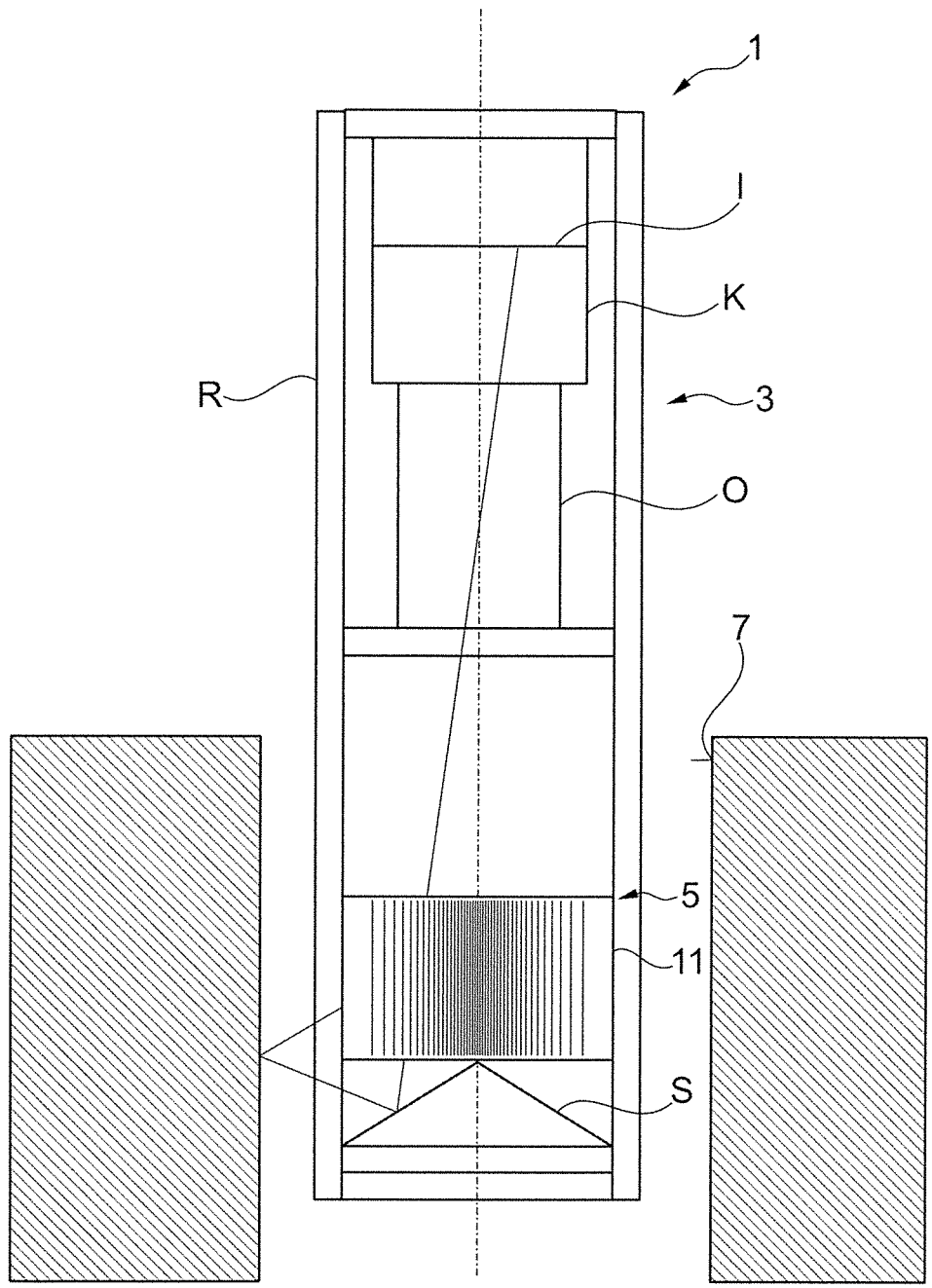
FIG. 5 shows a schematic diagram of another functional state of the third embodiment.

FIG. 5 shows as an example one of several additional possible light distributions, in particular in addition to the light distributions shown in FIG. 4. The illumination density varies in the circumferential direction. Light distributions which vary in a sine or cosine pattern along the circumference are especially preferred. An offset is preferably added to the sine or cosine function, so that there are no negative function values. One, two or more periods of the sine or cosine light distributions are preferably used along a circumferential angle of 360°. Several of these sine or cosine light distributions are especially preferably used, in particular in such a way that the distributions are derived from an original distribution by phase shifting. A sine or cosine distribution by 0°, 90°, 180° or 270° is especially preferably shifted in phase by that amount. In particular, the light distribution BV3 may be phase shifted by 0°, BV4 may be phase shifted by 90°, BV5 by 180° and BV6 by 270°. Such light distributions are suitable in particular for detecting inclinations of the interior wall of the bore in the circumferential direction.

If using axially structured light distributions and circumferentially structured light distributions, it is then possible to detect inclinations in both the axial direction and in the circumferential direction. Alternatively or additionally, it is also possible to use differently structured light distributions, for example, those with a structure running diagonally with respect to the axial direction and the circumferential direction. It is possible in particular to use sine or cosine patterns that are inclined relative to the axial direction, especially preferably by +45° and/or by −45°. These patterns may in turn preferably have a phase shift by 0°, 90°, 180° and 270°. An especially preferred number of light distributions is eight. Light distributions BV1 to BV4 are inclined by +45° relative to the axial direction, for example, and phase shifted by 0°, 90°, 180° and/or 270° relative to BV1. The light distributions BV5 to BV8 are then inclined by −45°, for example, relative to the axial direction and phase shifted by 0°, 90°, 180° and/or 270° relative to BV5. Such light distributions are suitable for detecting inclinations obliquely to the axial direction, in particular by +45° and/or by −45°, of the inside surface of the bore. Inclinations in the axial direction and in the circumferential direction can then in turn be deduced from this information by coordinate transformation. The apparatus illustrated in FIGS. 4 and 5 is equipped for recording images of an interior wall in bright field illumination in particular.

Moreover, it is found that, on the whole, it is possible by means of the apparatus and the method proposed here to detect both reflective and diffusely scattering interior walls. In particular bright field illumination is preferred for reflective interior walls, in particular those that are highly reflective, and dark field illumination is preferred for diffusely scattering interior walls in particular.

Alternatively, a plurality of planar lights may also be used.

Figure 6:
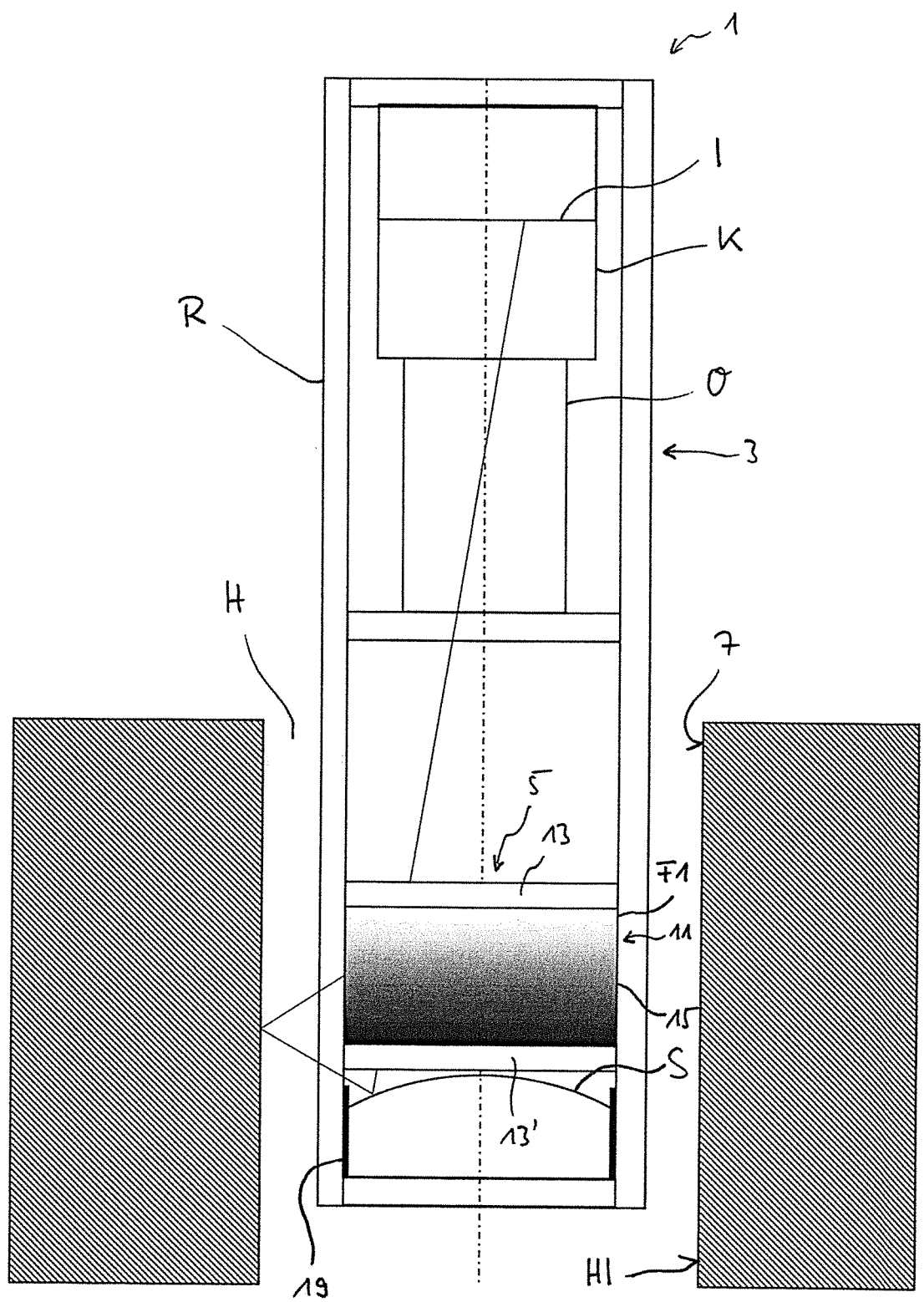
FIG. 6 shows a schematic diagram of a fourth embodiment of the apparatus.
Figure 7:
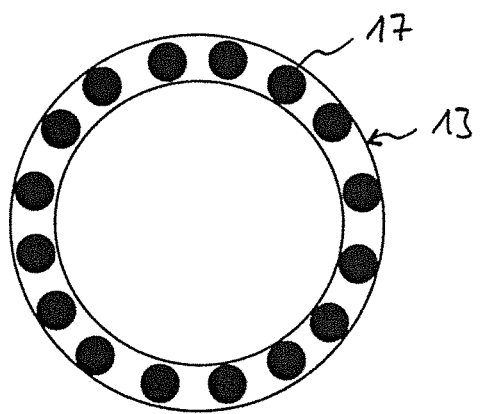
FIG. 7 shows another schematic diagram of the fourth embodiment of the apparatus.

In particular, the planar light 11 and/or the planar light F1—as illustrated in FIG. 6—may also be constructed so that it is formed from one or more ring lights, i.e., ring-shaped light sources and a scattering body. In particular two ring lights 13, 13', which are arranged at the ends of a preferably cylindrical scattering body 15 and pass through the scattering body 15, preferably in the axial direction, are preferred. The ring lights 13, 13' in turn comprise a plurality of lighting elements 17—as shown in FIG. 7 as an example for the first ring light 13, only one of which is labeled with reference numeral 17 here for the sake of better comprehensibility, and whose brightness can be controlled—in particular independently of one another—so that the desired light distribution of the planar light F1 and in particular on the scattering body 15 can be created. Thus, for example in control of the first ring light 13 and its lighting elements 17 with maximum brightness and of the second ring light 13' and its lighting elements with a minimum brightness, an axially structured light distribution can be generated, in particular a steadily increasing or decreasing light distribution, in particular a linearly or approximately linearly increasing or decreasing light distribution. On the other hand, a different light distribution can be created, in particular the opposite light distribution in comparison with the previous light distribution, with control of the first ring light 13 and its lighting elements 17 with minimum brightness and control of the second ring light 13' and its lighting elements with maximum brightness. However, in addition to axially structured light distributions, light distributions structured in the circumferential direction may also be implemented, so that the individual lighting elements 17 of the first ring light 13 and/or the lighting elements of the second ring light 13' are operated with a brightness that varies along the circumferential direction. In this way, light distributions structured in the circumferential direction can be created, in particular also those with a sine and/or cosine curve or an approximation to such a curve. In particular, light distributions structured in the axial direction or in the circumferential direction can also be created. It is advantageous in particular if the brightness of the lighting elements 17 of the first ring light 13 and/or the lighting elements of the second ring light 13' can be controlled individually. A greater or lesser number of ring lights 13, 13' may also be used.

FIGS. 6 and 7 show one such arrangement. The same elements and those having the same function are labeled with the same reference numerals, so that reference is made to the preceding description in this regard. The image plane in FIG. 7 is perpendicular to the image plane in FIG. 6 and in particular the observer's view in FIG. 7 is directed axially at an end face of the first ring light 13 facing the scattering body 15. In such an arrangement, a mirror S, in particular a conical mirror S, a spherical mirror, a parabolic mirror, an ellipsoidal mirror, a rotationally symmetrical mirror or a free-form mirror is preferably used with such an arrangement. It may be a convex mirror in particular. A convex spherical mirror is especially preferred. Such an apparatus 1 preferably and in particular operates exclusively in bright field illumination. With this apparatus 1, preferably no area is illuminated with dark field conditions. Alternatively, one or more shadows 19 may also be provided, masking out a possible dark field region. Based on those conditions, the optical and mechanical design may preferably be such that a possible dark field region is already illuminated structurally and/or optically.

Alternatively or additionally, a number of lighting elements, in particular lighting elements in close proximity to one another, may be arranged on or near the surface of the planar light F1, which can be controlled in their brightness, preferably on an individual basis. In addition, a scattering body, which equalizes possible irregularities at the transition between the individual light sources, may preferably also be used.

Figure 8:
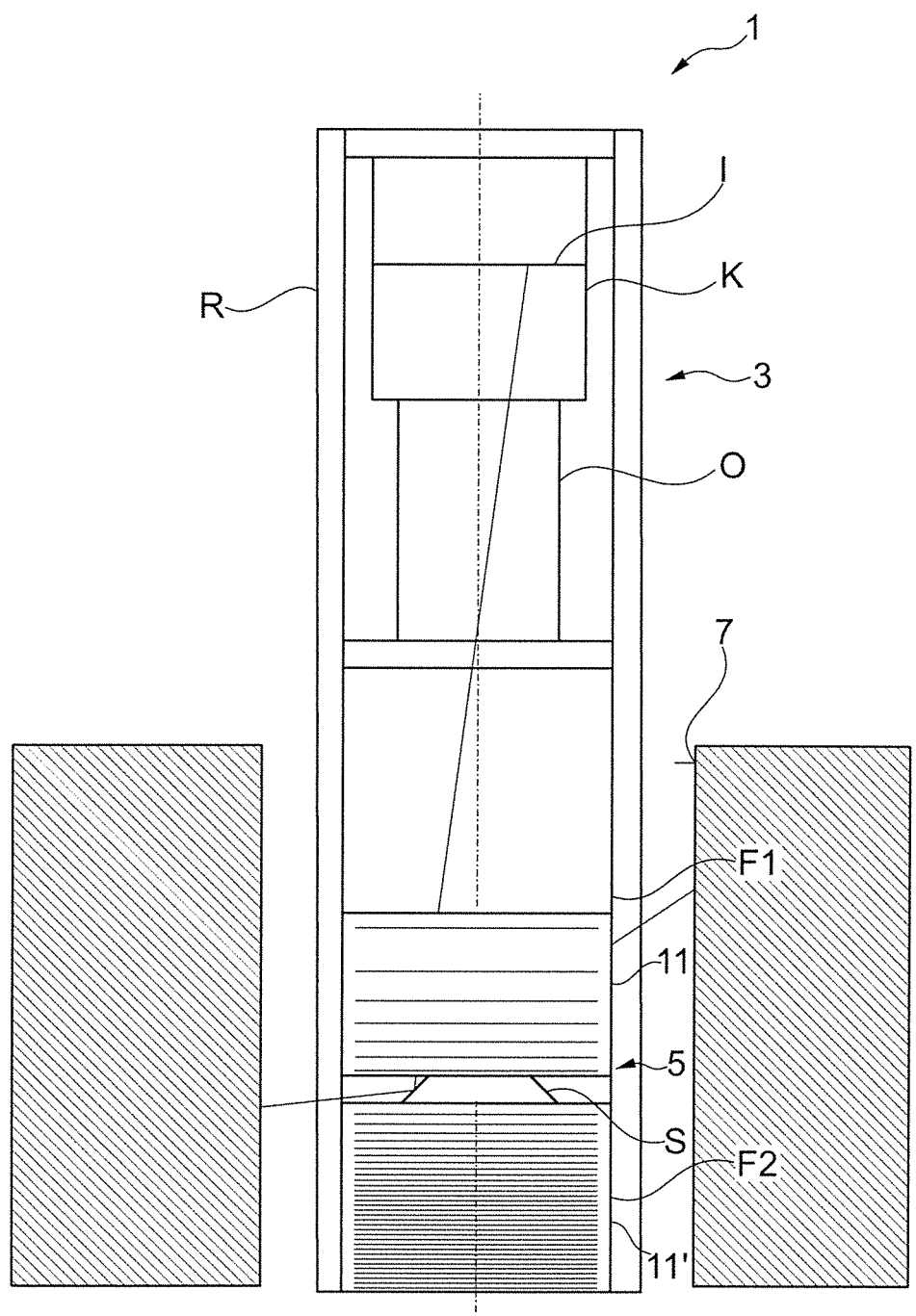
FIG. 8 shows a schematic diagram of a fifth embodiment of the apparatus.

FIG. 8 shows an apparatus comprising two planar lights 11, 11', which are also referred to as lights F1 and F2. This makes it possible to place the visible range on the interior wall of the bore between the two planar lights 11, 11'. The aperture angle of the cone may amount to 90° here, for example. The light distributions preferably extend over both planar lights. For example, a linear light distribution may also begin in the axial direction on one of the planar lights and be continued on the second planar light. A light distribution in the circumferential direction extends preferably also over both planar lights, so that the light distribution on the one planar light is continued on the second planar light. Alternatively, more than two planar lights are also possible. Alternatively or additionally, other light distributions are also possible, in particular those running diagonally. The embodiment of the apparatus illustrated in FIG. 8 is equipped to record an interior wall in bright field illumination in particular. It is possible that with the lighting arrangement chosen here, there are also axial areas, in which a dark field illumination is implemented. However, preferably only one type of lighting is in fact used for recording images of the interior wall. In particular, care is taken to ensure through suitably designed and arranged shielding elements that the areas of the interior wall recorded by the camera are recorded under defined lighting conditions, In particular either only with bright field illumination or only with dark illumination. It is possible in this way to create unambiguous lighting conditions for the interior wall, which facilitates the analysis of the image recorded.

The invention claimed is:

1. An apparatus for optical detection of an inner wall, comprising:
   at least one camera;
   an optical imaging arrangement; and
   a lighting arrangement,
   wherein the apparatus is configured to record images of a plurality of areas of an interior wall offset axially from one another in a panoramic view using the camera,
   wherein the lighting arrangement has at least two different functional states, wherein a first brightness distribution emitted by the lighting arrangement is assigned to a first functional state, the first brightness distribution differing from a second brightness distribution emitted by the lighting arrangement in at least a second functional state, and
   wherein the apparatus is configured to switch between the first brightness distribution and the second brightness distribution with a frequency of at least 25 Hz.

2. The apparatus according to claim 1, wherein the lighting arrangement has at least three different functional states, wherein a brightness distribution different from the brightness distributions of the other functional states is assigned to each functional state.

3. The apparatus according to claim 1, wherein the at least one camera, the optical imaging arrangement, and the lighting arrangement are integrally displaceable together.

4. The apparatus according to claim 1, wherein the at least one camera, the optical imaging arrangement, and the lighting arrangement are integral with one another.

5. The apparatus according to claim 1, wherein the optical imaging arrangement has a camera lens and/or a mirror array.

6. The apparatus according to claim 1, wherein the lighting arrangement is configured to directly or indirectly light the inner wall with the optical imaging arrangement.

7. The apparatus according to claim 1, wherein the lighting arrangement has at least two light sources switchable independently of one another and/or at least one planar light, wherein the planar light is equipped to display a first structured lighting pattern in the first functional state and a second structured lighting pattern in the second functional state, the second functional state is different from the first lighting pattern.

8. The apparatus according to claim 1, wherein the lighting arrangement has at least two planar lights, which are arranged with an axial distance between them, wherein the optical imaging arrangement is equipped and is positioned relative to the lights, so that an area of the interior wall can be imaged axially between the planar lights in the camera.

9. The apparatus according to claim 1, wherein the lighting arrangement has at least two ring-shaped light sources spaced a distance apart from one another axially, switchable independently of one another.

10. The apparatus according to claim 1, wherein the lighting arrangement has at least four different functional states, wherein a brightness distribution different from the brightness distributions of the other functional states is assigned to each functional state.

11. The apparatus according to claim 1, wherein the apparatus isconfigured to record an axial section of the inner wall along a closed circumferential line in each recorded individual image.

12. The apparatus according to claim 1, wherein the lighting arrangement emits brightness distributions that vary axially in at least one of a radial direction and a circumferential direction such that the inner wall is illuminated from different spatial directions in the first and second functional states of the lighting arrangement.

13. The apparatus according to claim 1, wherein the lighting arrangement illuminates points of a bore inner surface of the inner wall with different brightness distributions.

14. The apparatus according to claim 1, wherein the camera is configured to record a 360° view, in a circumferential direction, in a single recorded image.

15. The apparatus according to claim 1, wherein the camera is configured to record an axial section of the interior wall along a closed circumferential line in a single recorded image.

16. The apparatus according to claim 1, wherein the lighting arrangement is equipped to emit brightness distributions that vary in at least one direction selected from an axial direction, a radial direction and a circumferential direction, such that the inner wall is illuminated from different spatial directions in the different functional states of the lighting arrangement.

17. A method for optical detection of inner walls with an apparatus for optical detection the apparatus for optical detection including at least one camera, an optical imaging arrangement and a lighting arrangement, the method comprising:

recording an image sequence of areas offset axially from one another with the camera in a panoramic view of the interior wall, and simultaneously controlling the lighting arrangement to emit brightness distributions that change during the recording of the image sequence, wherein the lighting arrangement has at least two different functional states, wherein a first brightness distribution emitted by the lighting arrangement is assigned to a first functional state, the first brightness distribution differing from a second brightness distribution emitted b the lighting arrangement in at least a second functional state.

18. The method according to claim 17, wherein the apparatus is displaced incrementally or continuously at least partially, in an axial direction.

19. The method according to claim 17, wherein a change in the brightness distributions is implemented with a frequency of at least 25 Hz.

20. The method according to claim 17, wherein a cyclic sequence of a predetermined number of brightness distributions is created, wherein for each brightness distribution a ring-shaped area of a sensor of the camera with a radial width measured as a number of pixels of the sensor is evaluated, wherein the number of pixels is equal to the predetermined number of brightness distribution or equal to an integral multiple thereof, wherein an axial offset of a region of the interior wall recorded with the next brightness distribution relative to a previous brightness distribution immediately preceding the current one is selected to be equal to an axial height resulting from the number of pixels indicated by the width of the ring-shaped area divided by the predetermined number of brightness distributions and multiplied times an optical pixel height of the sensor on the interior wall.

21. The method according to claim 17, wherein a cyclical sequence of a predetermined number of brightness distributions is generated, running through at least five cycles.

* * * * *